2,797,620
REVERSIBLE REARVIEW MIRROR

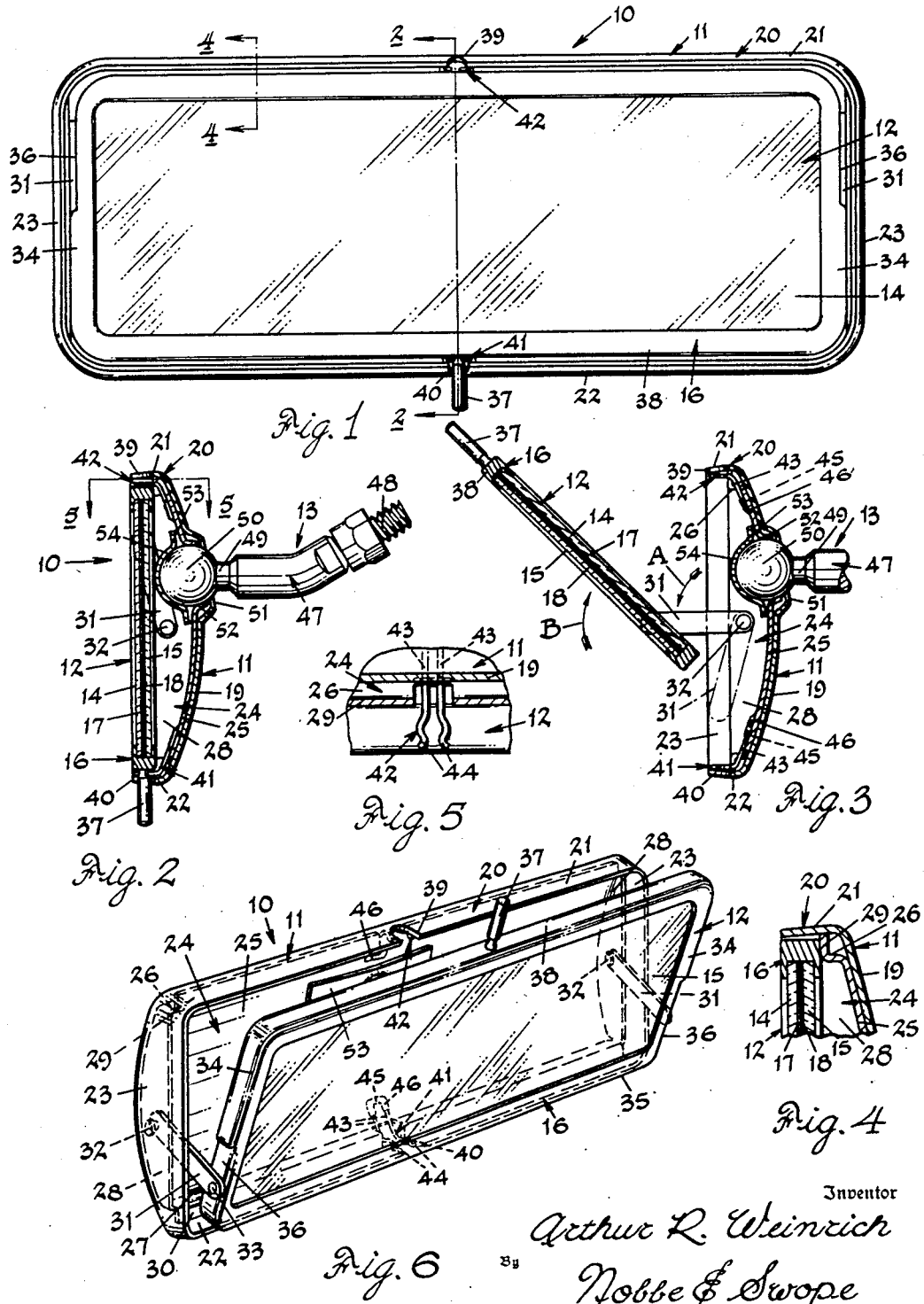
July 2, 1957      A. R. WEINRICH      2,797,620
REVERSIBLE REARVIEW MIRROR
Original Filed July 16, 1949
Inventor
Arthur R. Weinrich
Nobbe & Swope
Attorneys United States Patent Office 2,797,620
Patented July 2, 1957

Arthur R. Weinrich, Dallas, Tex., assignor to Libbey-Owens-Ford Glass Company, Toledo, Ohio, a corporation of Ohio Continuation of application Serial No. 105,147, July 16, 1949, now abandoned. This application September 16, 1953, Serial No. 380,451

4 Claims. (Cl. 88—77)

The present invention relates to improvements in rear view mirrors such as are used in automobiles and the like.

This application is a continuation of my copending application Serial No. 105,147, filed July 16, 1949, now abandoned.

The primary purpose in the use of a rear view automobile mirror is of course to provide the driver with a satisfactory view of the rear road conditions under the various conditions of driving. Heretofore, the rear view mirrors ordinarily employed have been provided with reflectivities which gave a reasonably acceptable compromise for most drivers between glare elimination and good visibility.

This invention has to do with a special type of rear view mirror having two surfaces of differing reflective values and being reversible so that either surface may be selectively brought into operative viewing position by the driver of the vehicle. Preferably, one reflective surface is in the form of an ordinary mirror for use in day driving while the other provides a mirror for night driving which will reduce the brilliancy of the reflecting headlights of an automobile approaching from the rear.

An important object of the invention is the provision of a rear view mirror of the above type having means of a novel and improved character which enables the driver to easily and quickly locate the desired mirror surface in his normal line of vision with a minimum of effort and attention on his part.

Another object of the invention is the provision of a rear view mirror embodying a supporting housing or case, the front of which is open, and a reversible mirror unit closing the front of the case when in normal operative position and being rotatably mounted with respect thereto to provide a selection of mirror surfaces for day and night driving.

Another object of the invention is the provision of a rear view mirror assembly embodying a case within which the mirror unit is mounted for both pivotal and rotary movement, the several parts of the assembly being so associated with one another as to provide a simple, compact arrangement which enables the driver of the vehicle to readily effect reversal of the mirror unit relative to the case.

A further object of the invention is the provision of a reversible rear view mirror assembly of the above character in combination with means for supporting the same upon the structure of the vehicle for bodily adjustment with reference to said supporting structure to bring the mirror unit into any desired angular position to accommodate persons of different height and seating position.

Other objects and advantages of the invention will become more apparent during the course of the following description, when taken in connection with the accompanying drawings.

In the drawings, wherein like numerals are employed to designate like parts throughout the same:

Fig. 1 is a front elevation of a rear view mirror constructed in accordance with the invention;

Fig. 2 is a vertical transverse section taken on line 2—2 of Fig. 1;

Fig. 3 is a similar vertical transverse section but showing the mirror unit in partially reversed position;

Fig. 4 is a vertical detail section taken on line 4—4 of Fig. 1;

Fig. 5 is a horizontal detail section taken on line 5—5 of Fig. 2; and

Fig. 6 is a perspective view of the rear view mirror assembly with the parts thereof positioned substantially as shown in Fig. 3.

Referring now to the drawing, the rear view mirror provided by the invention is designated in its entirety by the numeral 10. The mirror assembly generally comprises a supporting housing or case 11 carrying a reversible mirror unit 12, and being adjustably supported within an automobile or the like by a mounting means 13.

Although the invention is not limited to the use of any specific type of reversible mirror unit 12, it may be composed as herein shown, by way of example, of two mirror elements 14 and 15 arranged back to back and mounted in a bezel 16. The mirror elements 14 and 15 may have their inner, adjacent surfaces provided with reflective coatings 17 and 18 respectively of different reflecting values, with one mirror coating being highly reflective and suitable for daytime driving, while the other mirror coating is of a relatively lower reflectivity suitable for nighttime driving. For the night driving surface, the reflecting surface of a piece of black glass may be employed and a suitable other mirrored glass employed for day driving. The mirror unit 12 is both rotatably and hingedly associated with the case 11 in such a manner that either mirror surface may be selectively brought by the driver of the automobile into operative position in his line of vision.

The case 11 is substantially rectangular in outline and comprises a rear wall 19 which is preferably curved in its transverse axis. Formed integral with the rear wall 19 is a forwardly and preferably slightly inwardly directed peripheral flange 20 defining a top wall 21, bottom wall 22, and opposite end walls 23.

Mounted within the case 11 is a liner plate 24 which is formed to closely conform to the interior contour of the case so as to interfit snugly therewith. The liner plate 24 also comprises a rear wall 25 and a forwardly bent peripheral flange defining a top wall 26, a bottom wall 27, and opposite end walls 28. The rear wall 25 of the liner plate is preferably in contact with the rear wall 19 of the case, while the peripheral flange of the liner plate is enclosed by the peripheral flange 20 of the case. The top and bottom walls 26 and 27 of the liner plate are provided with the upwardly and downwardly bent tongue portions 29 and 30 against which the mirror unit 12 abuts when it is in operative viewing position and which serve to locate the mirror unit in such position.

The mirror unit 12 is supported with respect to the case 11 in such a way that it may be withdrawn outwardly therefrom by the driver of the automobile and substantially simultaneously rotated to reverse the positions of the mirror elements 14 and 15. More particularly, the mirror unit is both hingedly and rotatably connected at its opposite ends to the case by links 31. These links are pivotally supported at their inner ends upon studs 32 carried by the end walls 28 of the liner plate 24 substantially midway between the top wall 26 and bottom wall 27 thereof or, in other words, on the longitudinal center line of the case 11. At their outer free ends, the links 31 are disposed at the opposite ends of the mirror unit and serve to rotatably support the trunnions 33 carried by the bezel 16. The trunnions are fixedly secured in the opposite ends 34 of the bezel in horizontal alignment with one another and are located closely adjacent the side 35 thereof. In other words, the trunnions 33 are positioned to one side of the longitudinal center line of the mirror unit. Preferably, the ends 34 of the bezel are formed with notches or relief areas 36 for the links 31 so that the said links will be located between the bezel and the ends walls 28 of the liner plate 24 when the mirror unit is in normal viewing position within the case as shown in Fig. 1.

The mirror unit 12 can be easily and quickly reversed by the driver through use of an operating handle 37 which is suitably secured to the side 38 of the bezel 16 intermediate the ends thereof. When the mirror unit is located in normal viewing position within the open side of the case as in Figs. 1 and 2, the handle 37 will be received in notches 39 or 40 provided respectively in the top wall 21 and bottom wall 22 of the case flange 20, depending upon which mirror element is presented to the driver's view. Thus, by means of the handle 37, the mirror unit can be initially swung outwardly from the case 11, reversed, and returned to operative position with respect thereto.

When the mirror unit is located within the case 11 to present the mirror element 14 in normal viewing position as in Figs. 1 and 2, it is secured in such position by a spring clip 41 which is arranged to resiliently grp the handle 37 when it is moved into notch 40. On the other hand, when the mirror unit is disposed to present the opposite mirror element 15 in viewing position, the handle 37 is gripped by a spring clip 42 associated with notch 39. The clips 41 and 42 may be formed of suitably bent U-shaped wires having leg portions 43 which are shaped at their ends as at 44 to project outwardly and resiliently snap about the handle 37. The clips are also provided with loop portions 45 secured to the rear wall 25 of the liner plate as at 46.

In operation, and assuming the mirror element 14 is located in viewing position, as in Fig. 2, and it becomes desirable to replace it by the mirror element 15, the driver of the vehicle need only grasp the handle 37 and pull the same forwardly from the notch 40 in the lower case wall 22 to overcome the gripping influence of the spring clip 41. As the mirror unit 12 moves bodily forwardly from the case, the lnks 31 will swing radially downwardly about the studs 32 as indicated by the arrow A in Fig. 3, and simultaneously the mirror unit will be rotated on the trunnions 33 in a clockwise direction as indicated by the arrow B. Since the weight of the mirror unit is sufficient to cause downward swinging of the links 31 on studs 32 when the mirror unit is withdrawn from the case, the driver actually need only pull the said mirror unit outwardly from the case and control the rate of descent of the links by means of the handle 37.

During the downward, radial swinging movement of the links 31, the pivotal support afforded by the trunnions 33 permits the mirror unit 12 to rotate in a clockwise direction, and when the links reach the limit of their downward movement, as shown in broken lines in Fig. 3, the mirror unit can be easily swung inwardly to return it to position within the case 11. The mirror elements 14 and 15 are thus reversed and will be held in such position when the handle 37 is pushed into the notch 39 and between the ends 44 of the spring clip 42.

To again reverse the positions of the mirror elements 14 and 15 by returning the mirror unit 12 to the position shown in Fig. 2, the handle 37 is employed to swing the mirror unit outwardly and downwardly while the links 31 simultaneously swing radially upwardly from their position indicated in broken lines in Fig. 3 to the position shown in full lines. By then rotating the mirror unit counter-clockwise upon the trunnions 33 while simultaneously applying an upward thrust thereto, the links will be swung upwardly while the mirror unit is urged inwardly until it is received within the case and the handle 37 located in the notch 40 of the case bottom wall 22 where it will be resiliently held by the clip 41.

Preferably, the mirror assembly 10 is supported within an automobile or the like in such a manner that it can be bodily adjusted to any desired angular position to reflect images from the rear of the automobile to the driver according to his height and seating position. The mounting means 13, herein shown, is one form of adjustable mounting which may be used for this purpose, and comprises an arm 47 which is secured to the framing structure of the automobile by means of its threaded shank 48. Opposite the threaded shank, the arm 47 is provided with a shank 49 of reduced diameter that terminates in a spherical or ball end 50. The shank 49 of the arm extends through an opening 51 in the rear wall 19 of the case and the ball end 50 is mounted in a spherical bearing or seat 52 formed in the rear wall 25 of the liner plate 24. The ball end is retained in this seat by a spring metal strap 53 having a centrally formed bearing surface 54 conforming to and engaging said ball. The strap 53 may be suitably secured at its opposite ends to the liner plate and coacts with the bearing seat 52 to grip the ball 50 with sufficient force to maintain the mirror assembly 10 stationary upon the ball except when it is adjusted bodily upon the said ball to the driver's requirements.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In a rear view mirror for automobiles and the like, a substantially rectangular supporting case open at the front thereof and having a rear wall and also with opposite end walls, means connected to said case for attaching said mirror to an automobile, a mirror unit normally closing the front of the case and having two oppositely facing reflective surfaces of different reflecting values, and means connecting the mirror unit to the case comprising a pair of links pivoted at their inner ends to the opposite end walls of the case on substantially the longitudinal center line thereof and at their outer ends rotatably supporting the mirror unit between a longitudinal edge and the longitudinal center line thereof so that upon pivoting of the links in one direction at their inner ends, the mirror unit may be simultaneously rotated in the opposite direction upon said links to effect the reversal of said mirror unit to present the desired reflecting surface to the driver.

2. In a rear view mirror for automobiles and the like, a substantially rectangular supporting case open at the front thereof and having a rear wall and also with opposite end walls, means connected to said case for attaching said mirror to an automobile, a mirror unit normally closing the front of the case and having two oppositely facing reflective surfaces of different reflecting values, means connecting the mirror unit to the case comprising aligned studs carried by the opposite end walls of the case on substantially the longitudinal center line thereof, links pivoted at their inner ends upon said studs to swing upwardly or downwardly, aligned trunnions carried at the opposite ends of the mirror unit and rotatably supported in the outer ends of said links, said trunnions being positioned to one side of the longitudinal center line of the mirror unit so that they are located relatively close to but spaced from one longitudinal edge thereof, and means carried on the opposite longitudinal edge of the mirror unit by which the said mirror unit may be pivoted in one direction upon said studs and substantially simultaneously rotated in the opposite direction upon said trunnions to effect the reversal thereof and thereby present the desired reflecting surface to the driver.

3. In a rear view mirror for automobiles and the like, a substantially rectangular supporting case open at the front thereof and having a rear wall and also with opposite end walls, means connected to said case for attaching said mirror to an automobile, a mirror unit normally closing the front of the case and having two oppositely facing reflective surfaces of different reflecting values, means connecting the mirror unit to the case comprising aligned studs carried by the opposite end walls of the case on substantially the longitudinal center line thereof, links pivoted at their inner ends upon said studs to swing upwardly or downwardly, aligned trunnions carried at the opposite ends of the mirror unit and rotatably supported in the outer ends of said links, said trunnions being positioned to one side of the longitudinal center line of the mirror unit so that they are located relatively close to but spaced from one longitudinal edge thereof, and means carried on the opposite longitudinal edge of the mirror unit by which the said mirror unit may be pivoted in one direction upon said studs and substantially simultaneously rotated in the opposite direction upon said trunnions to effect the reversal thereof and thereby present the desired reflecting surface to the driver, the opposite ends of said mirror unit being provided with notched portions at opposite sides of the trunnions to receive the links when the mirror unit is in normal closed position with respect to the case.

4. In a rear view mirror for automobiles and the like, a substantially rectangular supporting case open at the front thereof and having a rear wall and also with opposite end walls, means connected to said case for attaching said mirror to an automobile, a mirror unit normally closing the front of the case and having two oppositely facing reflective surfaces of different reflecting values, means connecting the mirror unit to the case comprising aligned studs carried by the opposite end walls of the case on substantially the longitudinal center line thereof, links pivoted at their inner ends upon said studs to swing upwardly or downwardly, aligned trunnions carried at the opposite ends of the mirror unit and rotatably supported in the outer ends of said links, said trunnions being positioned to one side of the longitudinal center line of the mirror unit so that they are located relatively close to but spaced from one longitudinal edge thereof, means carried on the opposite longitudinal edge of the mirror unit by which the said mirror unit may be pivoted in one direction upon said studs and substantially simultaneously rotated in the opposite direction upon said trunnions to effect the reversal thereof and thereby present the desired reflecting surface to the driver, the opposite ends of said mirror unit being provided with notched portions at opposite sides of the trunnions to receive the links when the mirror unit is in normal closed position with respect to the case, and means carried by the case and engaging the mirror unit for maintaining the latter in said normally closed position.

References Cited in the file of this patent

UNITED STATES PATENTS

| | | |
|---|---|---|
| 1,817,766 | Rhodes | Aug. 4, 1931 |
| 1,876,319 | Smith | Sept. 6, 1932 |
| 2,087,531 | Kronquist | July 20, 1937 |
| 2,136,625 | Lasko | Nov. 15, 1938 |
| 2,307,532 | Murphy | Jan. 5, 1943 |
| 2,469,207 | Koedding | May 3, 1949 |